Dec. 9, 1952        S. E. PACE        2,620,575
LOADING CONVEYER
Filed June 27, 1947        3 Sheets-Sheet 1
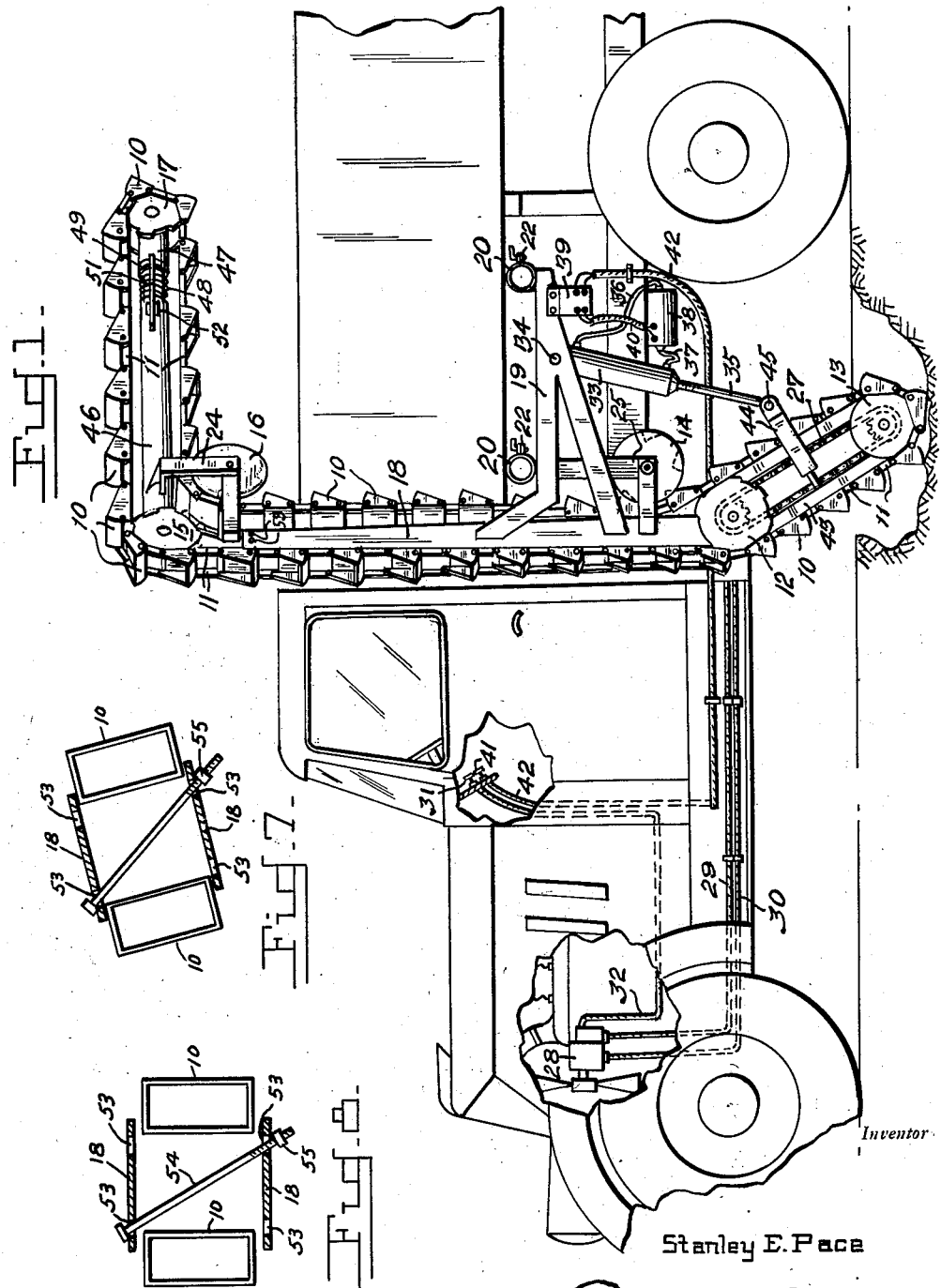
Inventor
Stanley E. Pace
By Randolph & Beavers
Attorneys Dec. 9, 1952 S. E. PACE 2,620,575
LOADING CONVEYER
Filed June 27, 1947 3 Sheets-Sheet 2
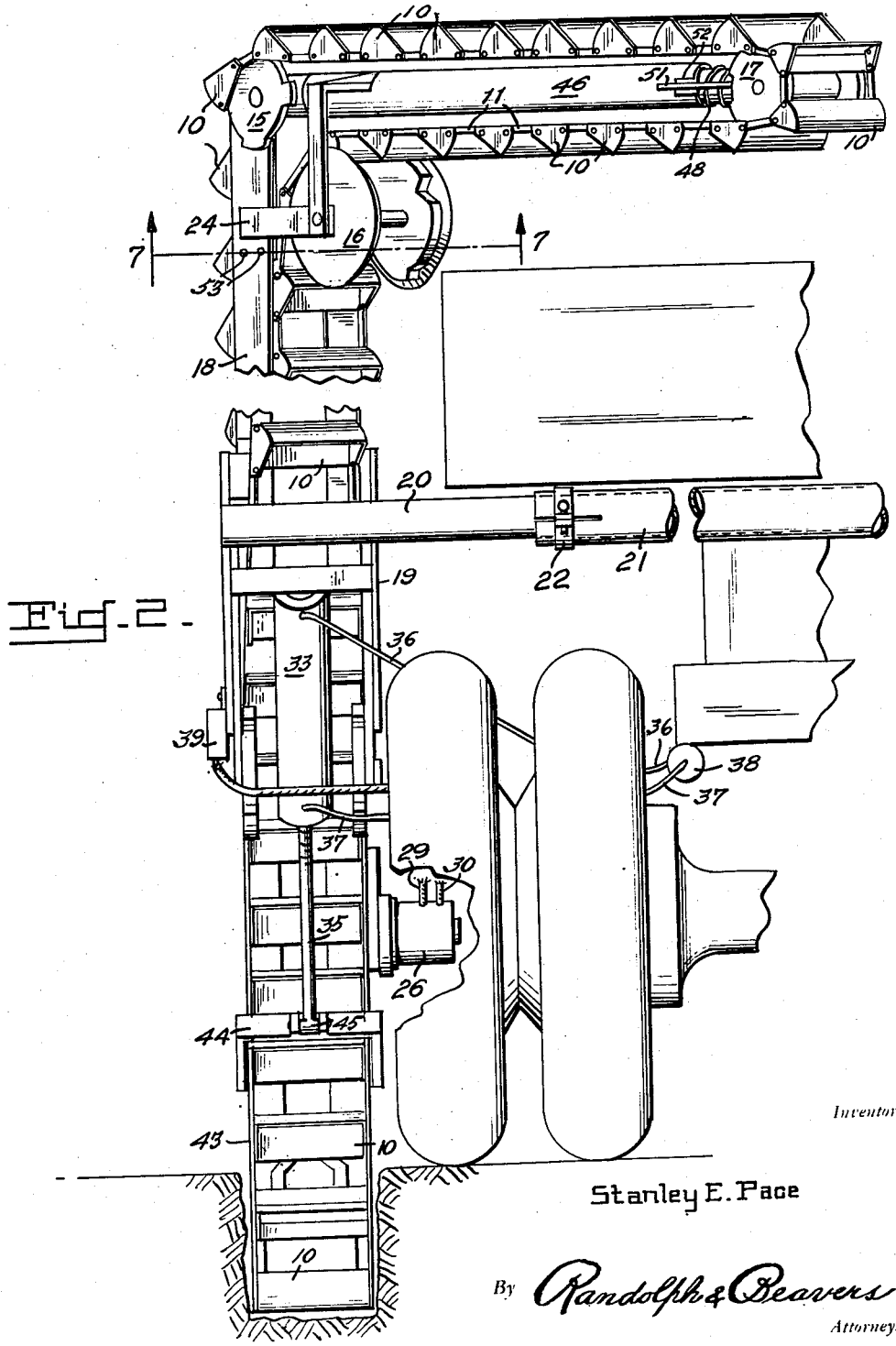
Inventor
Stanley E. Pace
By Randolph & Beavers
Attorneys Dec. 9, 1952 S. E. PACE 2,620,575
LOADING CONVEYER
Filed June 27, 1947 3 Sheets-Sheet 3
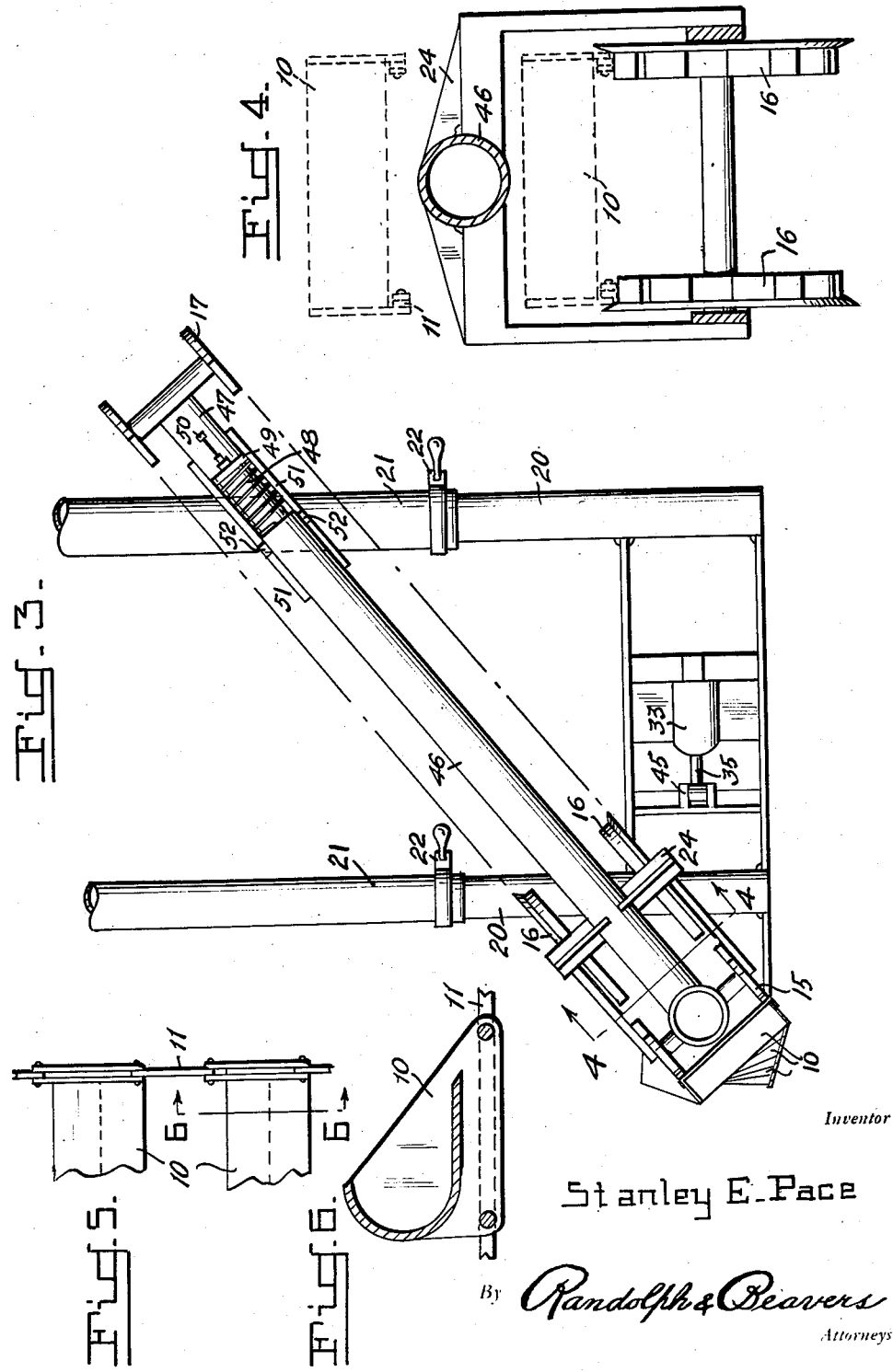
Inventor
Stanley E. Pace
By Randolph & Beavers
Attorneys Patented Dec. 9, 1952

2,620,575

UNITED STATES PATENT OFFICE 2,620,575

LOADING CONVEYER

Stanley E. Pace, Pontiac, Mich., assignor of one-half to Lorin L. Cronkright, Pontiac, Mich.

Application June 27, 1947, Serial No. 757,601

1 Claim. (Cl. 37—8)

The present invention relates to a loading conveyer and it consists in the combinations, constructions and arrangements of parts herein described and claimed.

Generally, the invention provides an apparatus which may be carried by a conventional truck as an attachment thereto and it consists of an endless chain of buckets which may be raised and lowered with respect to the ground at the control of the truck operator, and which may be arranged so as to deliver into the truck upon which it is mounted or into a path outside the truck path, in which latter case it may be arranged to deliver into an adjoining truck which may be moving alongside the truck having the apparatus described herein. It may be arranged to cut from a bank by lowering the conveyer to ground level or a ditch may be dug by lowering the conveyer to a point below the ground level of the truck wheels. The conveyer is particularly useful for snow removal and like jobs. Power is obtained from the truck engine and all controls are within the cab of the truck so that the truck operator may operate and control the same while moving the truck itself forwardly, if so desired.

It is an object of the invention to provide a simple conveyer mechanism for attachment to a truck.

Another object of the invention is the provision of a conveyer for trucks and the like having a novel control mechanism.

A further object of the invention is the provision of a novel arrangement for moving a portion of an endless conveyer at the will of an operator.

A still further object of the invention is the provision of a novel arrangement of mechanisms for controlling the position of the discharge end of an endless conveyer.

Other and further objects of the invention will become apparent from a reading of the following specification taken in conjunction with the drawing, in which:

Figure 1 is an elevational view of an embodiment of the invention,

Figure 2 is an enlarged rear elevational view of the device shown in Figure 1,

Figure 3 is a plan view, in part, of Figure 1,

Figure 4 is an enlarged sectional view of a portion of the apparatus with certain parts removed and taken substantially along line 4—4 of Figure 3, Figure 5 is a fragmentary plan view of certain elements of the invention, Figure 6 is an enlarged sectional view taken along line 6—6 of Figure 5, Figure 7 is an enlarged fragmentary sectional view with certain parts removed taken substantially along line 7—7 of Figure 2, and Figure 8 is a view similar to Figure 7 but illustrating the position the essential portions of the device may assume when not under tension of a bolt shown in such drawing and forming a part of the invention.

Referring more particularly to the drawing, there is shown therein an endless conveyer consisting of a series of scoop buckets 10 interconnected by links 11 and adapted to be held in position by a drive sprocket 12, a driven sprocket 13, an idler sprocket 15, a supporting idler 16 and an adjustable idler 17.

A vertical frame member 18 is adapted to revolubly carry the idler 15 at its upper end and the drive sprocket 12 at its lower end and is in turn supported by a bracket 19 carried by the outer ends of a pair of transversely extending arms 20 which are adapted to telescope within arms 21 and be held in selected positions by means of clamps 22. The arms 21 are supported by the chassis of the truck in any suitable manner.

A bracket 24 is carried by the frame 18 for the support of the idler 16 and a bracket 25 is affixed to the frame 18 and bracket 19 for the support of an idler 14.

The drive sprocket 12 is adapted to be moved by an oil pump motor 26 and is connected with the sprocket 13 by means of a chain 27. The motor 26 is connected with a fluid pump 28 by means of oil lines 29 and 30 and is controlled by means of a valve 31 mounted conveniently to the truck operator and connected to the fluid pump 28 by a flexible cable 32.

A hydraulically operated cylinder 33 is pivotally connected to the bracket 19, as indicated at 34 and is adapted to move a ram 35 by means of pressure supplied through lines 36 and 37 connected with a hydraulic pump 38 which is controllable by means of a switch 39 electrically connected to the pump 38 by means of a cable 40 containing suitable wiring and to a control switch 41 by a cable 42 containing suitable wiring.

The fluid pump 28 is adapted to be operated by the engine of the truck.

A frame member 43 carries the sprockets 12 and 13 and has centrally mounted thereon a bracket 44 which is pivotally connected at 45 to the ram 35. A rearwardly extending arm 46 is affixed to the bracket 24 and frame 18 and is provided with an extension 47 which is telescopically mounted therein and held in yieldable engagement therewith by means of a spring 48 interposed between the rear end of the arm 46 and a collar 49. An adjusting screw 50 is provided for tensioning of the spring 48. A pair of aligning arms 51 is carried by the extension 47 and they are adapted to extend between guide dogs 52 carried by the arm 46.

The frame 18 is provided with staggered holes 53 in each side adjacent its upper end for the reception of a bolt or the like to determine the angle at which the conveyer discharges, it being apparent that if a bolt 54 is extended through an opening 53 in one side of the frame 18 and then through an opening 53 not in registry therewith in the opposite side of the frame 18 that tightening of a nut 55 upon the end of the bolt will cause the sides of the frame to warp. Proper selection of holes 53 will allow the position of the upper end of the apparatus to be controlled. This action is illustrated in Figures 7 and 8 wherein the normal condition of the frame members and allied structure are illustrated in Figure 8 and the distorted condition thereof illustrated in Figure 7.

In operation, it will be apparent that the position of the entire working apparatus may be adjusted laterally with respect to the truck by moving the arms 20 into or out of the arms 21 and then securing such position by tightening the clamps 22. The height of the driving sprocket 13 and consequently the operating level of the buckets 10 is determined by operation of the valve 41 which controls the motor 38 and thereby the position of the ram 35. The movement of the conveyer itself is controlled by the switch 31 through the control of the fluid pump 28 and hence the pump 26 and drive sprocket 12. The angle at which the discharge end of the conveyer is placed with respect to the body of the truck is controlled by the setting of a bolt in the openings 53 in the sides of the frame 18.

While but one form of the invention has been shown and described herein, it will be readily apparent to those skilled in the art that many minor modifications may be made herein without departing from the spirit of the invention or the scope of the appended claim.

What is claimed is:

An apparatus of the character described comprising, in combination, an automotive truck having an engine, an endless bucket-type conveyer having a vertical portion, a horizontal portion at the upper end of the vertical portion and a pivoted extension portion at the lower end of the vertical portion, and means for changing the horizontal angle of the horizontal portion of the conveyor with respect to the longitudinal axis of the truck, said means including a pair of vertically extending elongated side frame members for said vertical portion, said side members each having a pair of horizontally spaced holes adjacent their upper ends, a bolt selectively positioned in a hole in each of said side members, and a nut for said bolt, whereby tightening of said nut will cause a warping of said side members in accordance with the positioning of said bolt.

STANLEY E. PACE.

REFERENCES CITED

The following references are of record in the file of this patent:

UNITED STATES PATENTS

| Number | Name | Date |
|---|---|---|
| 748,160 | Brothers | Dec. 29, 1903 |
| 856,916 | Schaal | June 11, 1907 |
| 957,722 | Walker | May 10, 1910 |
| 983,906 | Kelly | Feb. 14, 1911 |
| 1,313,221 | Jackson | Aug. 12, 1919 |
| 1,428,540 | Ferris | Sept. 12, 1922 |
| 2,017,477 | Shippee | Oct. 15, 1935 |
| 2,332,686 | Austin et al. | Oct. 26, 1943 |

FOREIGN PATENTS

| Number | Country | Date |
|---|---|---|
| 382,635 | Germany | Oct. 4, 1923 |